UNITED STATES PATENT OFFICE.

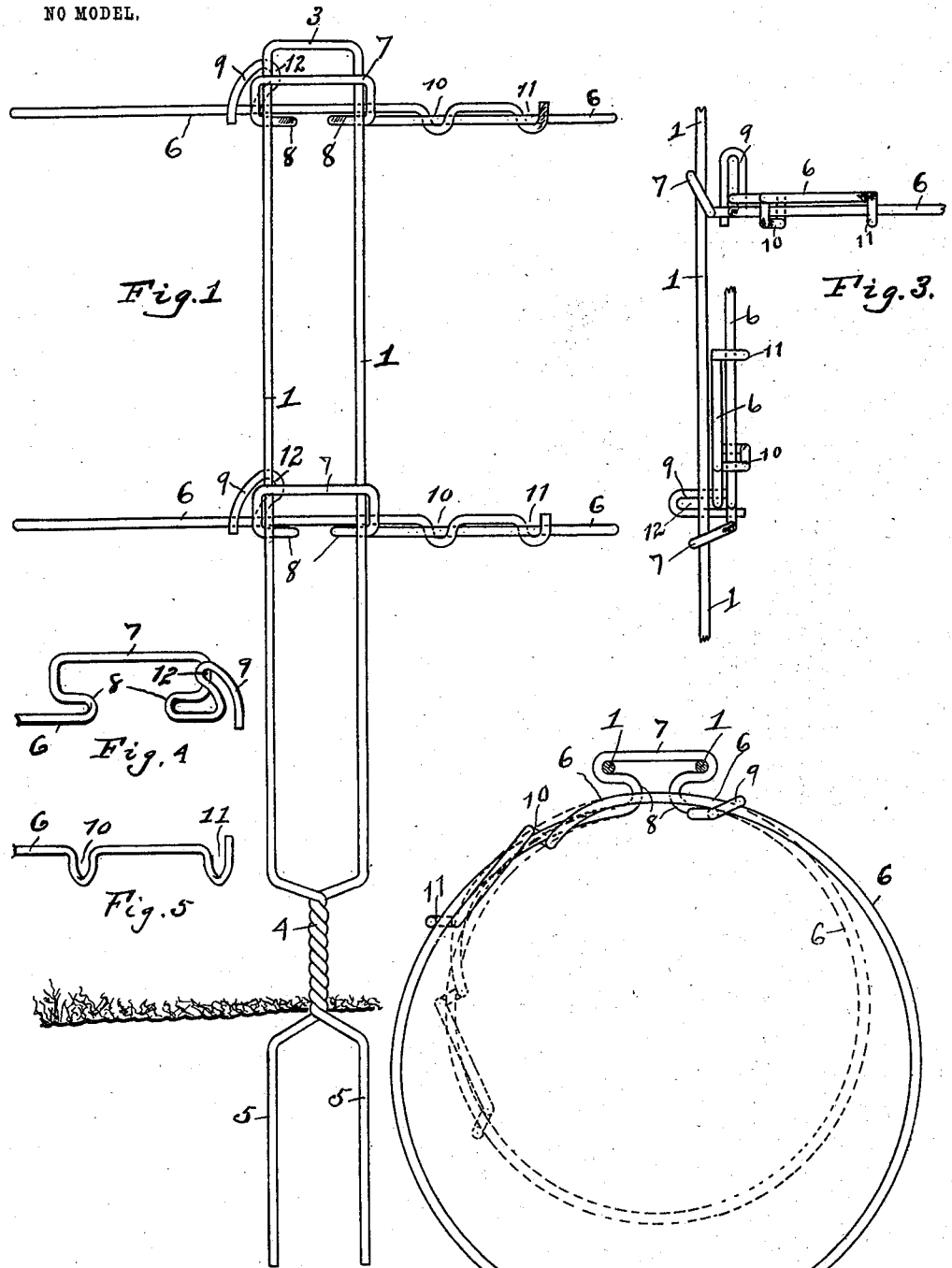

JOHN H. BROXEY, OF DAYTON, OHIO.

PLANT-SUPPORT.

SPECIFICATION forming part of Letters Patent No. 726,631, dated April 28, 1903.

Application filed February 2, 1903. Serial No. 141,485. (No model.)

*To all whom it may concern:*

Be it known that I, JOHN H. BROXEY, a citizen of the United States, residing at Dayton, in the county of Montgomery and State of Ohio, have invented certain new and useful Improvements in Plant-Supports; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in plant-supports which are adapted to hold plants in an upright position while growing.

The object of the invention is to provide a plant-support the hoops of which are adjustable to vary their diameters.

A further object of the invention is to provide a plant-support the hoops of which may be placed parallel with the supporting-stake for convenience in shipment and for convenience in cultivating the plants.

A further object of the invention is to provide a stake consisting of two upright integral members which terminate in forks which enter the ground and prevent any twisting movement of the stake while in a position to support a plant; and a further object of the invention is to provide such a stake with that portion immediately above the ground reduced to the least possible space in order that the cultivation of the plant may not be interfered with.

Preceding a detail description of the invention reference is made to the accompanying drawings, of which—

Figure 1 is a rear elevation of my improved plant-holder. Fig. 2 is a top plan view with the two members of the stake shown in section. Fig. 3 is a side elevation of the upper portion of the support, showing one of the hoops or rings lowered to a horizontal or operative position and the other one of such hoops or rings elevated parallel with the stake. Figs. 4 and 5 are enlarged detail views of the locking ends of the hoop.

Similar reference characters indicate corresponding parts.

The stake is of a suitable height for the plant which it is intended to support, and the said stake is made out of a continuous piece of wire of a suitable diameter to meet the requirements. This piece of wire is bent to form two parallel parts 1 1 of a suitable distance apart and which are joined at the upper portion by a cross-piece 3, which is an integral part of the wire, as before stated. The lower portion of the stake, consisting of these upright parts 1 1, is formed by twisting said parts together, as at 4, and from said twist the wire terminates in forks 5 5, which enter the ground to the point where the twist stops. The ground-line is indicated in Fig. 1, where it will be seen that the width of the support immediately above the ground-line is considerably reduced by reason of the twist 4. This enables the ground on all sides of the plant to be cultivated properly and without any interference from the stake. The forks of the stake, it will be understood, provide a proper and reliable anchorage of the stake within the ground, so that any turning movement of the stake within the ground is prevented. The hoops or rings which are supported on the stake and which inclose the plants are each made from a single piece of wire of the proper diameter. These pieces of wire forming the hoops 6 have a portion of their body or length bent to form a loop 7, which incloses the two sides 1 1 of the stake. The forward portion of the loop 7 projects on each end inwardly to inclose each of the sides 1 1 of the stake, as indicated at 8, and one of said inwardly-projecting portions 8 of said loop 7 terminates in a loop or hook 9, which projects over the hoop or ring and forms a lock for said hoop or ring to maintain the same in any position which increases or decreases the diameter of said hoop or ring, as shown in Fig. 2. The other end of said hoop or ring is formed in two loops 10 and 11, which inclose the body of the hoop and form an additional lock to hold said hoop in position. It will therefore be seen that the body of the hoop or ring may be shifted through the loops 9, 10, and 11 forming the locks to reduce the diameter of the ring, as shown in Fig. 2, when necessity requires, and that after the hoop or ring is adjusted to the proper position the natural spring of the wire forming the loops or locks 9, 10, and 11 will maintain the hoop or ring in such position. The inward bends 8 8 of the loop 7, it will be understood, are on the one side of the stake 1 1, and the body of said loop 7 is on the opposite side of said stake. This is essential, for the reason that the said inwardly-projecting portions 8 8 serve as a support to maintain the hoops or rings in a horizontal or operative position, as shown in Fig. 1. When said hoops or rings are elevated parallel with the stake 1 1, as shown in Fig. 3, where it will be seen the lower one of said hoops is thus elevated, the inner side 12 of the loop 9 will project behind one of the members 1 of the stake and will thus hold the ring or hoop in such elevated position, the natural spring of the wire forming said loop 9 being sufficient to maintain the hoop or ring in such position. The formations of the locks 9, 10, and 11, it is thought, are more clearly shown in Figs. 4 and 5. The hoop is maintained in the horizontal position by the engagement of the inward bends 8 8 of the loop 7 on one side, while the horizontal portion of the loop itself is on the other side of said members. The hoop is moved from one position to the other—that is to say, from the vertical to the horizontal, and vice versa—by simply elevating or lowering it with the hand.

Having described my invention, I claim—

1. A plant-support comprising two upright members united at their upper ends and having intervening space throughout their lengths, the lower ends of said members terminating in a fork adapted to enter the ground, rings supported upon said members, said rings consisting each of a continuous member in circular form with a loop in the body thereof inclosing the upright members, the ends of said loop being projected inwardly to inclose one side of said members and to act as a support to hold the ring in a horizontal position, and locks formed in the ends of said ring and whereby the said hoop or ring may be adjusted to reduce or increase its diameter, substantially as set forth.

2. In a plant-support, a ground-stake consisting of two upright parallel members terminating at their upper ends in an integral cross-piece and terminating adjacent to their lower ends in a twisted body from which point the said stake terminates in a fork adapted to enter the ground to a point adjacent to the lower terminal of the twisted body, rings provided with means for supporting them in horizontal positions or in positions parallel with said stake, each of said rings being adjustable to increase or decrease its diameter, and means on said rings for locking the same in each adjusted position, substantially as set forth.

3. In a plant-support, a ground-stake consisting of two parallel members 1 1 which are twisted to decrease the width of said stake immediately above the ground, the said stake terminating in ground-forks below said twisted portion, rings supported on said stake and adapted to inclose plants, each of said rings being adjustable to increase or decrease the diameter thereof, means for locking said rings in each adjusted position, and means for supporting said rings in positions at right angles to the stake and parallel with the stake, substantially as set forth.

4. In a plant-support, a stake consisting of two parallel members spaced apart and united at their upper ends, the said members being brought together to decrease the width of the stake immediately above the ground, and the said members terminating at their lower ends in fork, a series of rings supported on said stake, each of said rings having a loop in its body with inwardly-projected portions, said loop inclosing the two members of the stake, and the ends of said rings having loops thereon forming locks to hold said ring in position when adjusted to vary the diameter thereof, substantially as set forth.

In testimony whereof I affix my signature in presence of two witnesses.

JOHN H. BROXEY.

Witnesses:
R. J. McCARTY,
CAROLYN M. THEOBALD.